(12) United States Patent
Bossert et al.

(10) Patent No.: US 12,118,745 B2
(45) Date of Patent: Oct. 15, 2024

(54) METHOD FOR COUPLING CO-ORDINATE SYSTEMS, AND COMPUTER-ASSISTED SYSTEM (71) Applicant: TRUMPF Werkzeugmaschinen GmbH + Co. KG, Ditzingen (DE)

(72) Inventors: Daniel Bossert, Nussdorf (DE); Eberhard Wahl, Weilheim an der Teck (DE); Manuel Beuttler, Leonberg (DE)

(73) Assignee: TRUMPF TRACKING TECHNOLOGIES GMBH, Ditzingen (DE)

( * ) Notice: Subject to any disclaimer, the term of this patent is extended or adjusted under 35 U.S.C. 154(b) by 324 days.

(21) Appl. No.: 17/526,007

(22) Filed: Nov. 15, 2021

(65) Prior Publication Data

US 2022/0108471 A1 Apr. 7, 2022

Related U.S. Application Data (63) Continuation of application No. PCT/EP2020/063620, filed on May 15, 2020.

(30) Foreign Application Priority Data

May 15, 2019 (DE) ..................... 10 2019 112 781.5

(51) Int. Cl.
G06T 7/73 (2017.01)
G01S 17/08 (2006.01)
G01S 17/931 (2020.01)

(52) U.S. Cl.
CPC ............... *G06T 7/74* (2017.01); *G01S 17/08* (2013.01); *G01S 17/931* (2020.01); *G06T 2207/30244* (2013.01)

(58) Field of Classification Search
None
See application file for complete search history.

(56) References Cited

U.S. PATENT DOCUMENTS

2010/0231926 A1 9/2010 Maenken et al.
2011/0028865 A1 2/2011 Luinge et al.
(Continued)

FOREIGN PATENT DOCUMENTS

CN 107339984 A 11/2017
DE 102014002150 B3 7/2015
(Continued)

*Primary Examiner* — Kyle Zhai
(74) *Attorney, Agent, or Firm* — LEYDIG, VOIT & MAYER, LTD.

(57) ABSTRACT

A method for coupling a relative coordinate system of a relative automatic position finding system to an absolute coordinate system of an absolute localization system includes capturing optically identifiable identifiers of the localization system using a light sensor of a mobile apparatus of the relative automatic position finding system. The method further includes ascertaining a relative position for each of the captured optically identifiable identifiers in the relative coordinate system of the relative automatic position finding system, retrieving absolute positions of the optically identifiable identifiers in the absolute coordinate system, determining a position of the light sensor in the absolute coordinate system, and coupling, based on the determined position of the light sensor, the relative coordinate system to the absolute coordinate system.

13 Claims, 3 Drawing Sheets (56) References Cited

U.S. PATENT DOCUMENTS

| | | |
|---|---|---|
| 2015/0294506 A1 | 10/2015 | Bare et al. |
| 2015/0346722 A1 | 12/2015 | Herz et al. |
| 2016/0132046 A1 | 5/2016 | Beoughter et al. |
| 2016/0238692 A1 | 8/2016 | Hill et al. |
| 2016/0265919 A1 | 9/2016 | Schuller et al. |
| 2017/0123426 A1 | 5/2017 | Hill et al. |
| 2017/0124396 A1 | 5/2017 | Todeschini et al. |
| 2017/0243400 A1 | 8/2017 | Skidmore |
| 2018/0150899 A1 | 5/2018 | Waldron et al. |
| 2018/0330543 A1 | 11/2018 | Shand |
| 2020/0233432 A1 | 7/2020 | Mielenz et al. |
| 2020/0357188 A1* | 11/2020 | Kurabayashi ............. G06T 7/70 |

FOREIGN PATENT DOCUMENTS

| | | |
|---|---|---|
| DE | 102017217212 A1 | 3/2019 |
| EP | 2228665 A1 | 9/2010 |
| EP | 3165939 A1 | 5/2017 |
| WO | WO 2011015939 A2 | 2/2011 |
| WO | WO 2015123771 A1 | 8/2015 |
| WO | WO 2016041088 A1 | 3/2016 |
| WO | WO 2018213224 A1 | 11/2018 |

\* cited by examiner

METHOD FOR COUPLING CO-ORDINATE SYSTEMS, AND COMPUTER-ASSISTED SYSTEM

FIELD

The present disclosure relates to a method for coupling coordinate systems, in particular a coordinate system of a relative (automatic) position finding system to an absolute coordinate system of a surrounding space. Further, the disclosure relates to an in particular computer-aided system that is designed to augment visual perception or for autonomous movement of a mobile apparatus by means of visual perception of the surroundings as effected by the mobile apparatus.

BACKGROUND

In systems for augmented visual perception of surroundings or else in systems for automatic position finding of mobile apparatuses in surroundings, it may be necessary to compare a relative coordinate system against an absolute coordinate system of the surroundings. By way of example, visual perception can be augmented using augmented reality (AR) glasses. Producing augmented reality (AR) requires a known orientation of the AR glasses in the space. This orientation is fundamental for also correctly enriching the visible reality with the appropriate context in the visual range of the AR glasses. Since the sensitivity of a user of AR glasses toward the local stability of the additional display is very high, camera-based algorithms for simultaneous position determination and map preparation (also known as simultaneous localization and mapping (SLAM) algorithms) are normally used here. SLAM algorithms permit rapid orientation, meaning that virtual objects can be placed accurately.

Driverless transport vehicles or unmanned autonomous objects (as examples of mobile apparatuses that can be localized) also involve the use of SLAM algorithms in order to track relative changes of orientation and to use this to effect relative (automatic) position finding in the surroundings.

However, camera-based SLAM algorithms can only be used to keep track of relative orientations and therefore can only be used to produce relative localizations. An absolute local reference relating to the surroundings is not possible. Moreover, SLAM-based (generally light-based) orientation methods only allow information relating to the visible area to be assigned. Further, changes can only be followed if they are in the visible area. However, knowledge of indirectly visible objects is often required, for example for a search or when an object to be detected (e.g. a section of a material carrier) is outside a camera field but the information still needs to be made known to the user.

For an absolute local reference, i.e. a reference relating to the absolute coordinate system of the surroundings, it is possible to use WiFi patterns or so-called landmarks, e.g. inside buildings. If such absolute references are absent, however, correct absolute orientation of the apparatus, such as for example the AR glasses or the driverless transport vehicle, is not guaranteed. Sufficiently exact location determination for radio objects is furthermore not always possible on the basis of field attenuation measurement.

Another point consists in the incorporation of the real surroundings into the use of the AR glasses or the mobile apparatus. Changes in the surroundings inevitably occur and need to be taken into consideration when said surroundings are used. By way of example, physical material flow is a deliberate change during machine-based production. Other desired changes during production are tool changes and movements of means of transport and load carriers. Changes of location in interior spaces also occur regularly outside of production. As such, e.g. human beings move in rooms and farm animals now in sheds, or shopping carts are pushed through supermarkets.

Another aspect of interior-space position finding is the use of a realtime location system, called RTLS herein for short. An RTLS provides information containing a local reference for a multiplicity of localized units in real time and thereby produces data transparency for the localized units. A realtime location system (RTLS) is understood to mean determination of the "present" location of an identified object situated at an initially unknown location. This allows the position and whereabouts of objects, vehicles or persons to be determined. The term realtime characterizes the operation of IT systems that are able to reliably provide certain results within a predetermined period of time, for example in a fixed timeframe (latency).

Connecting this data transparency to person-related transparency requires an efficient user interface. This can be provided by AR glasses, for example. Efficient interaction of the two technologies is important here. AR glasses can e.g. use camera-based capture of the surroundings in order to find their own position using an SLAM algorithm.

SUMMARY

In an embodiment, the present disclosure provides a method for coupling a relative coordinate system of a relative automatic position finding system, which is based on scanning of surroundings, to an absolute coordinate system of an absolute localization system, which is based on signal interchange with at least temporarily stationary components of the absolute localization system. The method includes capturing optically identifiable identifiers of the localization system using a light sensor of a mobile apparatus of the relative automatic position finding system and ascertaining a relative position for each of the captured optically identifiable identifiers in the relative coordinate system of the relative automatic position finding system. The method further includes retrieving absolute positions of the optically identifiable identifiers in the absolute coordinate system, the optically identifiable identifiers being attached to the at least temporarily stationary components of the absolute localization system, determining a position of the light sensor in the absolute coordinate system by comparing the ascertained positions of the optically identifiable identifiers in the relative coordinate system with the retrieved absolute positions of the optically identifiable identifiers in the absolute coordinate system, and coupling, based on the determined position of the light sensor, the relative coordinate system to the absolute coordinate system. The relative automatic position finding system, as part of a computer-aided system, is designed to reproduce the position of the mobile apparatus in the relative coordinate system, and the light sensor is configured to determine the position of the mobile apparatus in the absolute coordinate system.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

One aspect of this disclosure is based allowing simple coupling of an automatic position finding system to an RTLS. By way of example, the disclosure provides for directly incorporating an AR unit or a mobile apparatus into an RTLS and to couple correspondingly underlying coordinate systems. In particular, the present disclosure provides for directly integrating AR glasses into an RTLS, in order both to improve the automatic position finding and the RTLS and to make it easy to use the AR glasses as a user interface for applications of the RTLS.

One aspect relates to a method for coupling a relative coordinate system of a relative automatic position finding system, which is based on scanning of surroundings, to an absolute coordinate system of an absolute localization system, which is based on signal interchange with stationary or at least temporarily stationary components of the absolute localization system. The localization system has optically (uniquely) identifiable identifiers provided on, in particular attached to, the stationary and at least temporarily stationary components of the localization system. The relative automatic position finding system has a mobile apparatus with a light sensor, wherein the relative automatic position finding system, as part of a (computer-aided) system (optionally with the aid of the light sensor, which is in particular functionally integrated in the automatic position finding system), is designed to reproduce the position of the mobile apparatus in the relative coordinate system. The light sensor is configured to determine the position of the mobile apparatus in the absolute coordinate system. The method comprises the steps of: capturing the identifiers using the light sensor and ascertaining a relative position for each of the captured identifiers in the relative coordinate system of the relative automatic position finding system, retrieving absolute positions of the identifiers in the absolute coordinate system, determining a position of the light sensor in the absolute coordinate system by comparing the ascertained positions of the identifiers in the relative coordinate system against the retrieved absolute positions of the identifiers in the absolute coordinate system, and coupling the relative coordinate system to the absolute coordinate system in view of the position of the light sensor.

A further aspect relates to a system, wherein the system can be provided in particular for augmenting visual perception or for autonomous movement of a mobile apparatus by means of visual perception of the surroundings as effected by the mobile apparatus. The system comprises a localization system and a relative automatic position finding system. The localization system comprises a data processing system, stationary components, mobile components that can be localized in an absolute coordinate system and multiple optical identifiers. The identifiers are for example light signal units for sending light signals. The identifiers are provided on/attached to components of the localization system. The relative automatic position finding system comprises a mobile apparatus having a light sensor. The relative automatic position finding system is based on scanning of surroundings of the mobile apparatus using the light sensor and is designed to reproduce the position of the mobile apparatus in a relative coordinate system. The light sensor is configured to determine the position of the mobile apparatus in an absolute coordinate system. The system further comprises a coupling computing unit for coupling the relative coordinate system to the absolute coordinate system, wherein the coupling computing unit is configured to carry out the method described previously.

In some developments, the relative automatic position finding system for determining relative changes of position can perform a simultaneous localization and mapping (SLAM) algorithm. This involves optionally detecting objects in the surroundings in the relative coordinate system and assigning the detected objects positions in the relative coordinate system. The SLAM algorithm can in particular be based on image processing of image data captured using the light sensor.

In some developments, the optical identifiers can comprise light sources that transmit unique light signals associated with the identifiers, wherein the light sensor captures the light signals. The light sources can optionally comprise flashing lights that emit symbols represented in flash sequences, the information content of which symbols can permit a unique inference of the light source and hence of the position of the light source in the absolute coordinate system. Further, the optical identifiers can comprise one-dimensional or two-dimensional code structures, in particular barcode structures. The code structures can represent symbols that comprise unique data associated with the identifiers, wherein the light sensor can capture the code structures.

In some developments, the optical identifiers can comprise retroreflectors that reflect incident light in such a way that the light sensor can capture the reflected light. A unique association between the reflected light and the retroreflector can be guaranteed for example by a retroreflector-specific influence on the frequency spectrum of the reflected light.

In some developments, the light sensor can be in the form of a camera, in particular a stereo camera. The relative position of the captured indicators can be ascertained by means of distance determination by way of two-dimensional or three-dimensional object detection in the image data of the camera. The light sensor can also be in the form of a light detection and ranging (LIDAR) sensor. The relative position of the captured indicators can be ascertained by means of distance determination by way of a propagation delay measurement.

In some developments, the computer-aided system can further comprise a light signal source on the mobile apparatus for generating light signals that can be captured using the light sensor of the relative automatic position finding system, as a result of which the indicators can be captured and the relative positions can be ascertained by using a camera with a projection system or a camera with laser-based time-of-flight (TOF) measurement for relative position finding. In particular, light signals in the infrared, visible and/or ultraviolet spectral range can be sent by the mobile apparatus.

In some developments, the absolute positions of the optical identifiers can be transmitted to the computer-aided system via a wireless communication channel by means of communication with the absolute localization system.

In some developments, the absolute localization system can be incorporated in a data network that covers the localization area of the absolute localization system for the purposes of data interchange, as a result of which the method can further comprise the following steps: moving the mobile apparatus into the localization area and transmitting the absolute positions of the optical identifiers present in the localization area to the mobile apparatus.

In some developments, the relative coordinate system can be coupled to the absolute coordinate system by using the known absolute positions, in particular provided by the localization system, of the stationary and/or the temporarily stationary components.

In some developments, the identifiers can be in the form of light signal units and the light sensor can be in the form of a camera, as a result of which the method can further comprise the following steps: initiating sending of light signals by the light signal units in a signal sequence predetermined for each of the light signal units, capturing the light signals using the camera, wherein the light signals form an arrangement of signal points associated with the respective light signal units in a camera image, determining the position of the camera in the absolute coordinate system by comparing the arrangement of signal points against the absolute positions of the light signal units in the absolute coordinate system that are associated with the signal points of the arrangement. The relative coordinate system can be coupled to the absolute coordinate system in view of the position of the camera in the absolute coordinate system by adjusting the attitude of the relative coordinate system with reference to the camera. The light signals can be sent in the infrared, visible and/or ultraviolet spectral range and the camera can accordingly be designed to detect infrared, visible and/or ultraviolet light. The comparison of the arrangement of signal points can involve the detected light signals being made to coincide with the known local reference of the related light signal units by means of coordinate transformation.

In some developments of the system, the data processing system can be configured to select stationary components, such as permanently installed transmission/reception units, or mobile components for which no movement is temporarily detected to participate in the coupling, in particular can be configured to actuate said components to transmit light signals when a coupling request is made by the mobile apparatus.

In some developments of the system, the mobile apparatus can be an augmented reality display apparatus, in particular augmented reality glasses, that is designed to augment visual perception. The augmented reality display apparatus can optionally be in the form of a user interface of the localization system. Alternatively or additionally, it can further be designed to represent display elements, the position of which in the absolute coordinate system is definite, to augment visual perception on the basis of the relative coordinate system.

In some developments of the system, the mobile apparatus can be a driverless transport apparatus, in particular a driverless transport vehicle or an autonomously flying drone. The computer-aided system can then be configured for autonomous movement of the mobile apparatus by means of visual perception of the surroundings as effected by the mobile apparatus.

In some developments of the system, the light sensor can be in the form of a camera, in particular a stereo camera, configured to determine distance by way of two-dimensional or three-dimensional object detection, or a light detection and ranging (LIDAR) sensor configured to determine distance by way of a propagation delay measurement.

In some developments, the computer-aided system can further comprise a light signal source that is provided on the mobile apparatus and designed to generate light signals that can be captured by means of the light sensor of the relative automatic position finding system. Said light signal source can optionally be a camera with a projection system or a camera with laser-based time-of-flight (TOF) measurement for relative position finding. The light signals can in particular be in the infrared, visible and/or ultraviolet spectral range.

In some developments of the system, the localization system can be configured to convey the absolute positions in the absolute coordinate system at which the identifiers, in particular the light signal units that transmit light signals, are positioned, and optionally the signal sequences of the light signal units to the coupling computing unit.

In some developments of the system, the light sensor can simultaneously be a camera for environment perception. Alternatively or additionally, the computer-aided system can further comprise, in addition to the light sensor, a camera for capturing an environment of the mobile apparatus. The localization system can be based on ultra-wideband communication, in particular an ultra-wideband pulse propagation delay measurement.

The concepts disclosed herein can allow an automatic position finding-based apparatus to quickly be ready for use with a fixed reference relating to the abstract coordinate system. Further, process reliability can be increased for the automatic position finding as a result of redundancy of the position finding operations and in particular as a result of a repeated comparison against absolute position finding operations. Moreover, this allows the real world, for example an apparatus whose position is found using an RTLS, to easily interact with a computer-aided system. It is also possible for the real world to interact (in a self-explanatory manner) with representations in the AR world, or an improved representation can be provided on the basis of the comparison against RTLS data in the AR system. Another advantage is that coupling of the coordinate systems is performed with no or only low latency.

Concepts are disclosed herein that permit at least some aspects from the prior art to be improved. In particular, further features and the practicalities thereof will emerge from the description of embodiments with reference to the figures that follows. In the figures:

Aspects described herein are based in part on the realization that an RTLS uses components that are static in the space, the known absolute positions of said components being able to be used for coupling the coordinate systems.

The text below explains direct incorporation and coupling of the AR unit using a realtime tracking or localization system, the coupling being able to take place at varying depths. As such, a first step can involve only the coordinate systems being coupled. This can be taken as a basis for checking and improving the automatic position finding, for example. In addition, mobile apparatuses can be controlled using AR glasses. This can be accomplished by relating the relative coordinate systems to one another by way of the present absolute coordinate system.

Figure 1:
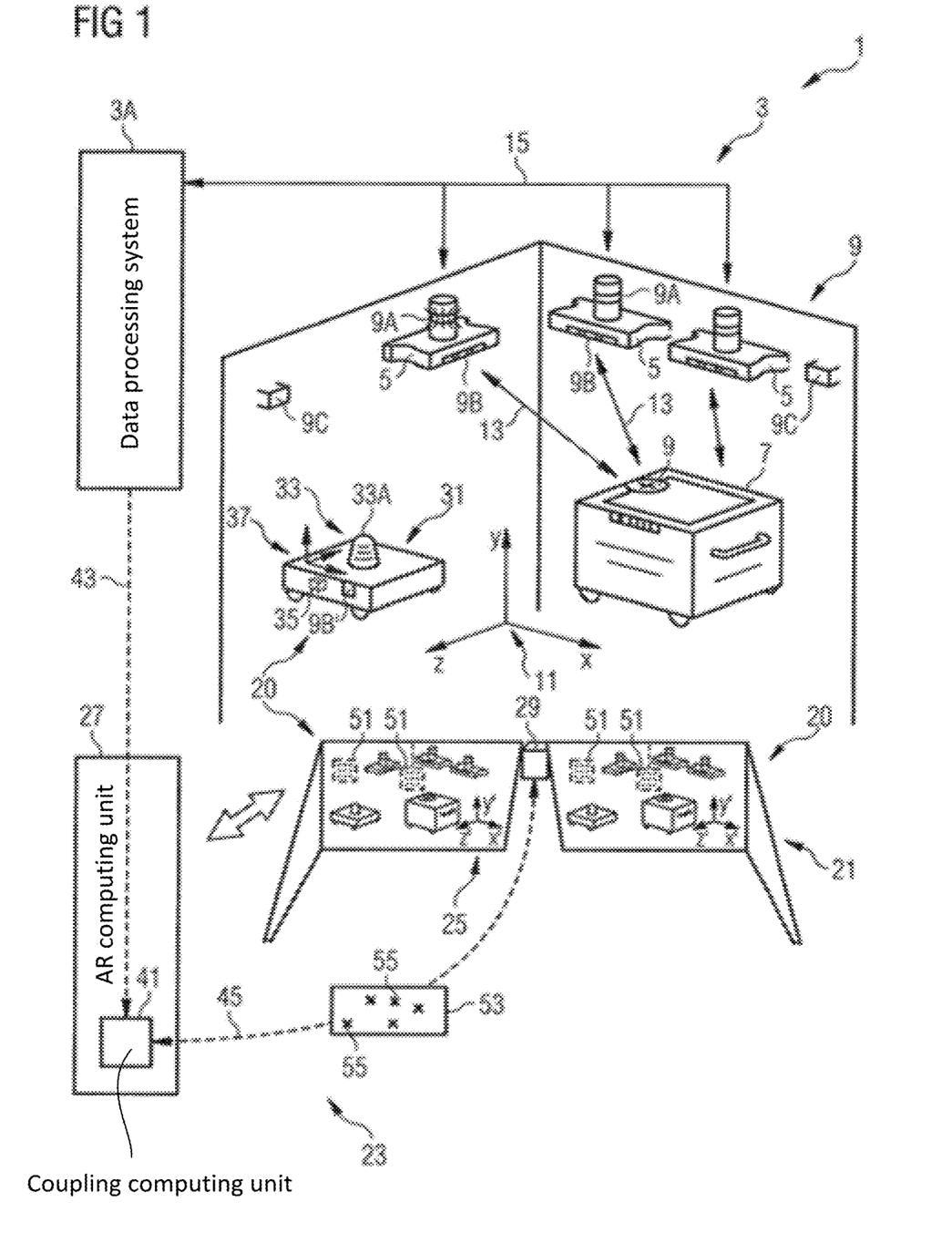
FIG. 1 shows a schematic spatial representation of an interior-space position finding system that is used together with AR glasses and a mobile transport apparatus.

FIG. 1 shows a computer-aided system 1 with a localization system 3 and a relative (automatic) position finding system 20. Such (automatic) position finding systems are used, among other things, for augmenting visual perception or for controlling autonomous movements of mobile apparatuses.

The localization system 3 comprises a data processing system 3A, stationary components 5 and mobile components 7 that can be localized in a coordinate system of the localization system 3. Further, the localization system 3 comprises optical identifiers 9, which are provided for coupling the coordinate system of the localization system 3 to a coordinate system of the (automatic) position finding system 20.

The coordinate system of the localization system 3 is matched to the surroundings, in particular to premises that are monitored using an interior-space position finding system. It is shown in FIG. 1 as an absolute coordinate system 11 by way of illustration. The localization takes place with regard to this absolute coordinate system 11, which forms the basis for the localization system 3.

The stationary components 5 are fixed points, the absolute positions of which in the absolute coordinate system 11 are available and in particular are stored in the data processing system 3A. Exact knowledge of the absolute positions is essential for high-precision location determination using the localization system 3.

The localization system 3 can be embodied as an ultra-wideband-(UWB)-based system, for example. Other localization systems are based on Bluetooth-based position finding, 5G-based position finding, both on its own and using sensor fusion with an inertial measuring unit or wheel hub sensors. In a UWB-based system, UWB signals 13 are interchanged between the stationary components 5 and the mobile components 7 to be localized. By way of example, the absolute position of a mobile component 7 to be localized can be obtained from the propagation delays between the components. Illustrative UWB systems are e.g. known from US 2016/0100289 A1 and the as yet unpublished PCT application PCT/FR2019/000057 "ULTRA-WIDEBAND LOCATION SYSTEMS AND METHODS" filed on Apr. 19, 2019.

In FIG. 1, the mobile component 7 to be localized is a transport cart, for example, which can be used to move workpieces to and fro between various processing stations. In the diagram in FIG. 1, the stationary components 5 in the interior space are mounted on the walls close to the ceiling. They are incorporated in a data network 15 (LAN, WLAN), for example, and can use said data network to interchange data with the data processing installation 3A. For the use of interior-space position finding systems, reference is made to the German patent applications DE 102017120378.8, DE 102017121098.9, DE 102017215613.9, DE 102017120381.8, DE 102017120382.6, DE 102017120383.4, DE 102017215608.2, DE 102018110145.7, DE 102018110150.3, DE 102018110074.4.

Various embodiments of identifiers 9 are indicated in FIG. 1 by way of illustration. Light signal units 9A, code structures 9B and retroreflectors 9C can be seen. The light signal units 9A and code structures 9B are designed such that e.g. they can be detected using a camera. The retroreflectors 9C can be used within a LIDAR system. In general, one or more types of identifiers 9 can be used for coupling the coordinate systems. As FIG. 1 shows, the identifiers 9 are attached to the components 5, 7 of the localization system 3, as a result of which the absolute positions of the identifiers 9 can be associated with those of the components (possibly with slight adaptation).

FIG. 1 also shows two apparatuses that are mobile, i.e. can move in the space, and that are equipped with an automatic position finding system 20. These are firstly an AR display apparatus 21, which is incorporated in an AR system 23. Secondly, they are an autonomously traveling (driverless) transport apparatus 31, here a driverless transport vehicle for transporting e.g. workpieces.

The mobile apparatuses are designed to use an automatic position finding method to track changes of position in the space. In this way, the position of a mobile apparatus in a relative coordinate system of the automatic position finding system can be used when using the respective apparatus. If the mobile apparatuses are incorporated into real surroundings, however, it is necessary to couple the relative coordinate system to the absolute coordinate system 11.

In one embodiment, this is accomplished by providing a light sensor on the mobile apparatus, which light sensor can be used to capture the identifiers 9 and to ascertain the positions of the identifiers 9 relative to the mobile apparatus. Depending on the identifier 9, the light sensors can be in the form of a camera or in the form of a LIDAR unit, for example. The light sensors such as a camera or a 3D LIDAR unit can be already existing hardware components of the mobile apparatus, for example, which e.g. is used for SLAM-based position finding. Further, the coupling of the coordinate systems can be used to increase the accuracy of the automatic position finding methods as a result of a repeated comparison against the absolute coordinate system.

The AR system 23 comprises an AR computing unit 27 and a camera 29 as light sensor. The AR computing unit is designed to compute virtual elements, which need to be represented in addition to the reality that is seen, vis-à-vis the views and positions in the relative coordinate system 25 that are to be shown and to output said virtual elements to the AR display apparatus 21.

For the purpose of coupling the coordinate systems 11, 25, the AR display apparatus 21 comprises the camera 29 for capturing light signals 19 that can be uniquely associated with the identifiers 9, for example on the basis of data evaluation or features of the identifiers 9. For calculations and data processing that need to be carried out during coupling, the AR computing unit 27 comprises a coupling computing unit 41, for example.

In the embodiment of the mobile apparatus as the transport apparatus 31, said mobile apparatus comprises a LIDAR unit 33 and a control computing unit 35 (with a coupling computing unit). The control computing unit 35 is designed to steer the transport apparatus 31 in the space, along a path that is to be determined, to a destination. So that the path to be determined takes account of information obtained using the localization system 3, a relative coordinate system 37 of the transport apparatus 31 can be coupled to the absolute coordinate system 11. The transport apparatus 31 accomplishes this by using the LIDAR unit 33 with a LIDAR sensor 33A that interacts with the LIDAR retroreflectors 9C, for example.

Further, it should be noted that the driverless transport apparatus 31 can also be used as a temporarily stationary component for coupling the coordinate systems 11, 25. Accordingly, an identifier (indicated as a 2D code structure 9B' by way of illustration) was also attached to the driverless transport apparatus 31. The possibility of involving nonstationary components 7 of the localization system 3 in the coupling methods is generally valid, provided that they are at a more or less stationary standstill at a location with a known position.

Figure 2:
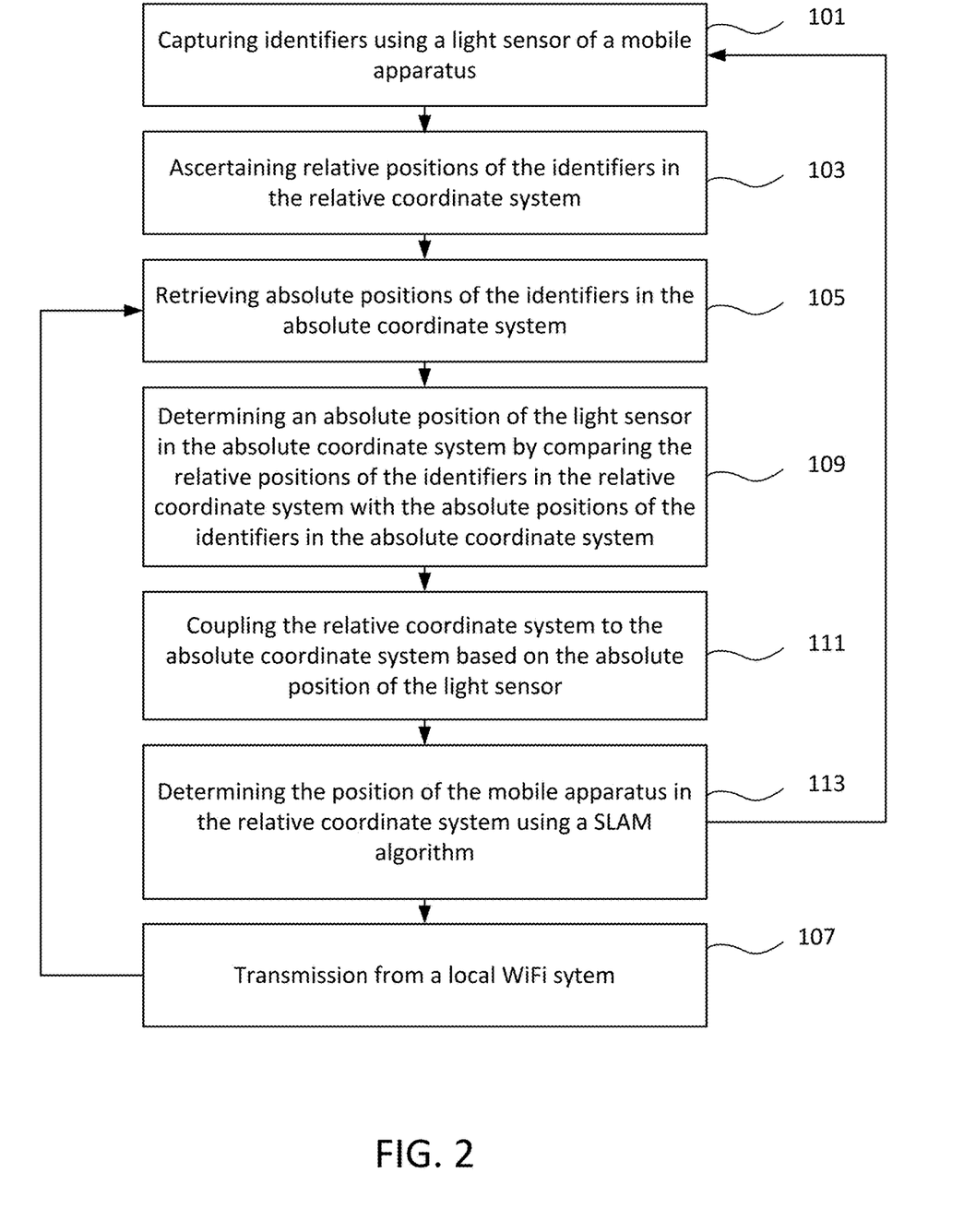
FIG. 2 shows a flowchart to illustrate the coupling methods proposed herein.

FIG. 2 illustrates the flow of a method for coupling relative and absolute coordinate systems. If a localization system such as the localization system 3 described previously has a localization area in which a mobile apparatus having an (automatic) position finding system is used, the following steps can be carried out:

The light sensor (the camera 29 or the LIDAR unit 33 in FIG. 1) is used to capture multiple identifiers 9 (step 101). The identifiers 9 do not necessarily need to be captured simultaneously but rather can also be captured successively or in groups, for example while moving through the space. For each of the captured identifiers 9, the position in the relative coordinate system (coordinate systems 25 and 37 in FIG. 2) is ascertained (step 103).

In general, each of the identifiers 9 has a known absolute position in the absolute coordinate system. These absolute positions can be made available to the mobile apparatus in advance by way of a radio connection. Following identification and relative position finding for one of the identifiers 9, the computed relative position is made to coincide with the known related absolute position, as a result of which the coordinate systems can also be made to coincide. There are various methods, e.g. averaging or probability methods, in the event of overdetermination.

Also referring to FIG. 2, if the absolute positions of the identifiers 9 in the absolute coordinate system are available, they can e.g. be retrieved from the data processing system (arrow 43 in FIG. 1). By way of example, this can take place when the mobile apparatus enters (step 105) the localization area of the localization system 3. If a mobile apparatus moves into a local WiFi system, for example, it can receive the number N of anchors and the related identification numbers (of the identifiers 9) in a transmission from said local WiFi system (step 107). The mobile apparatus therefore always has available the present coordinates of the absolute positions of the stationary components 5 (anchors) that can be used for the coupling. This is the case for as long as the mobile apparatus is situated in these restricted surroundings (i.e. in the localization area of the localization system 3). Similarly, absolute positions of quasi-stationary components 7 that can be used for the coupling can be provided.

By comparing the ascertained positions of the identifiers 9 in the relative coordinate system against the retrieved absolute positions of the identifiers 9 in the absolute coordinate system 11, the position of the light sensor in the absolute coordinate system 11 is determined (step 109). The comparison in this case can comprise scaling the size of the relative coordinate system in one or more axes and aligning the relative coordinate system with the absolute coordinate system. By way of example, the size scaling can be performed in such a way that the distance between two identifiers 9 in the relative coordinate system corresponds to the distance in the absolute coordinate system. Aligning the relative coordinate system with the absolute coordinate system can make the connecting vector between two identifiers 9 in the relative coordinate system identical to that in the absolute coordinate system. In view of the position of the light sensor, the relative coordinate system 25, 37 is coupled to the absolute coordinate system 11 (step 111). By way of example, transformation operations based on the size scaling and the alignment can record the relationship between the relative coordinate system and the absolute coordinate system and hence the coupling thereof.

After the coupling, the position determination can be performed e.g. by means of automatic position finding using an SLAM algorithm (step 113). By way of example, the SLAM algorithm detects objects in the surroundings of the mobile apparatus in the relative coordinate system and assigns the detected objects positions in the relative coordinate system. This permits relative changes of position in the relative coordinate system 25, 37 to be tracked. The SLAM algorithm can be based on image processing of images captured using the light sensor, for example.

The coupling can be performed repeatedly (continuously), in order to guarantee a continuous comparison of the coordinate systems. The coupling of the coordinate systems can thus in particular be used to compensate for or at least reduce drift in the relative position determination, for example if the mobile apparatus is able to compute using fixed update rates for the coupling data. Further, the coupling of the coordinate systems can be activated in a targeted manner, for example on the aforementioned entry into the localization area of a localization system.

Possible embodiments of features of the systems disclosed herein are explained below with reference to FIG. 1. Even if these are described by way of illustration for an augmented reality system, a person skilled in the art will recognize that they can be transferred to other applications of mobile apparatuses that are to be localized. Corresponding embodiments can be provided for autonomous transport apparatuses, for example.

As FIG. 1 indicates, AR glasses provide the opportunity to insert computer-generated content into the field of view of a wearer of the AR glasses. Known AR glasses are the products "Google Glass" from Google or "Hololens" from Microsoft. In contrast to pure virtual reality (VR) glasses, additional information is overlaid in the natural vision of the wearer. The insertion is triggered by way of AR markers, for example, and takes place in the form of images, small objects or text boxes. These are inserted into the field of vision of the AR glasses in the field of view at specific positions added to the reality and sometimes with scaling and orientation adapted to the reality.

The AR display apparatus 21 shown in FIG. 1 is "semi-transparent" 3D smart glasses, the wearer of which sees everything real in front of him "quite normally". Furthermore, the 3D smart glasses additionally provide, positioned over the objects, a useful work view and supporting data 51.

For the correct insertion, the 3D smart glasses also use the camera 29 to register what the wearer is looking at. In general, the 3D smart glasses can have an arrangement of multiple cameras that collectively scan the surroundings and provide image data for a wide variety of aspects of the AR processing. The image data can be used to analyze the surroundings of the 3D smart glasses. By way of example, objects that have associated AR markers are sought. In general, the surroundings can be captured three-dimensionally or else just two-dimensionally and at different frame rates.

The image data captured using the camera 29 can also comprise image data from the identifiers 9 of the localization system 3. The identifiers 9 in the camera image can be uniquely identified and associated with the identifiers 9.

In some embodiments, the localization system 3 uses a plurality of light signal units 9A or code structures 9B. By way of illustration, FIG. 1 shows a camera image 53 in which points 55 are shown for the captured light signal units 9A.

If coupling of the coordinate systems is requested by the mobile apparatus, in FIG. 1 e.g. the AR display apparatus 21, the light signal units 9A transmit flash signals e.g. in a defined order. Flash signals herein generally comprise a sequential sending of light signals that are sent separately from one another over time or are sent with an at least partial overlap over time. The light signals can differ in terms of spectrum, or the switch-on or switch-off points of the light signals can vary. A specific application on the mobile apparatus now detects the light cues in the camera image 53 and makes them coincide with the known local reference (the absolute positions) of the flashing light signal units 9A.

Unique light signals from the light signal units 9A can be implemented in the form of symbols, for example. This can be done using a Morse code or a code, for example. Flash rates used can be in the region of several 10 Hz, for example.

The camera 29 of the 3D smart glasses is an example of a light sensor that is embodied as a vision-based sensor and therefore allows direct signal interchange with the surroundings.

As an alternative to use with the light signal units 9A, the light sensor can for example also form a part of a LIDAR system (see the LIDAR unit 33 in FIG. 1 as part of the mobile transport apparatus 31). Such LIDAR units can broadcast light signals from the mobile apparatus in order to scan the surroundings by receiving signal components reflected from predetermined positions in the surroundings again. The reflection can take place at the retroreflectors 9C, for example, which are attached to the components of the localization system 3 and accordingly have absolute positions in the absolute coordinate system 11. It is therefore possible to perform a distance measurement from the mobile apparatus to the retroreflectors 9C (generally to components of the localization system 3 that are at known locations) for the purpose of position determination for the mobile apparatus in the absolute coordinate system.

The camera 29 can either be part of the AR display apparatus (and therefore have its function used e.g. for the 3D smart glasses) or can additionally be provided on the mobile apparatus specially for comparing the coordinate systems.

In order to use one-dimensional or two-dimensional codes 9B on the components, the light sensor is preferably in the form of part of a high-resolution camera-based system.

To increase the resolution for the position determination in the absolute coordinate system, a large number of identifiers can be used. This can lead to overdetermination, which can be offset by means of the relative position determination.

As an advantageous embodiment, it is possible to implement an RTLS using a UWB localization technique in the 3-10.5 GHz range with a frequency width of at least 500 MHz. Ideally, an RTLS is used that permits localization both on a server that forms the basis for the localization system and on the mobile apparatus itself.

By way of example, IR UWB systems in chip-integrated form are used. The space is equipped with permanently installed IR UWB anchors as stationary components 5 and the localization system is set up. A possible apparatus is for example a Windows-based solution, which means that software applications of the Hololens 3D glasses can be used. The data interchange is effected e.g. using a conventional WiFi system. For the SLAM algorithm, maps can be mapped on a server in the LAN or directly in the mobile apparatus. Additionally or alternatively, a UWB tag that ascertains its own position can be provided in the mobile apparatus.

In addition to coupling the coordinate systems, the mobile apparatus can also gain further access to the RTLS location database. As such, data relating to changes in the positions of the objects tracked using the localization system can be transmitted to the mobile apparatus in real time.

By way of example, the coupling of the coordinate systems is based on a sensor fusion that involves the RTLS being combined with a camera-based SLAM automatic position finding system. This fusion can provide not only absolute location information for the position obtained using the RTLS but also an increased spatial resolution for the camera-based SLAM algorithms. By way of example, self-learning algorithms can be used that allow localization with sub-cm accuracy over the entire localization area of the RTLS. Further, by playing back information from the camera-based detail position finding—for example relating to the position and alignment of an object equipped with a tag—it is possible to continuously optimize position finding methods of the RTLS, which allows a kind of calibration curve to be obtained for the RTLS.

The mobile apparatus can also use the movement data from the RTLS to correctly display context-relevant data on objects monitored using the RTLS.

A person skilled in the art will recognize that the tolerances in accuracy can be reduced by a multistage method. An improvement in accuracy can e.g. involve the RTLS providing the local reference of a mobile object, said local reference being connected to a tolerance. As soon as the object comes into the area visible to the user, the camera of the mobile apparatus undertakes the exact relative position finding. By way of example, the object can be detected in the captured image on the basis of its contour, the information about the contour being able to be provided by the communication band of the RTLS as well. As an alternative to the contour of the object with corresponding object detection in the camera image, the tracking can also be performed using a light cue transmitted by the mobile apparatus.

The coupling approaches described herein for the coordinate systems also affect the operation of an AR system or a mobile transport apparatus if these have available the locally accurate position data from the localization system.

The objective of AR applications is to provide a user with context-relevant information in real time. Important input data for this context-relevant information are not only the visible surroundings but also changes of location of objects, even if they cannot be detected by the AR system, and location-specific unique identifications.

Two exemplary instances from industrial manufacturing are the need for information concerning changes of location for displaying e.g. a forklift truck that will soon cross and is not yet visible to the user. Knowledge of the information from the localization system permits the user of the AR system to be warned about a possible collision. An example relating to the need for information for a process cycle in the case of industrial manufacturing is the need for unique identification of order information for one of many identical workpieces, the unique association not being able to be made in a camera-based manner. If the information is to be correctly presented on an AR display, this is often possible only with knowledge of the exact position of the workpiece. This is the case in particular if identical workpieces are associated with multiple orders during mass production, which means that differentiation by means of image analysis is not possible.

One possible way for the AR system and the localization system to interact is data interchange via a central data management system. The methods proposed herein allow all space-related data, including the changes, to be held in a central data hub, for example in the data processing system 3A in FIG. 1. When the coordinate systems are coupled, an AR application can receive the relevant information from the central data management system.

The solutions proposed herein allow direct incorporation of the AR unit into a realtime tracking system. This coupling can take place at varying depths.

Figure 3:
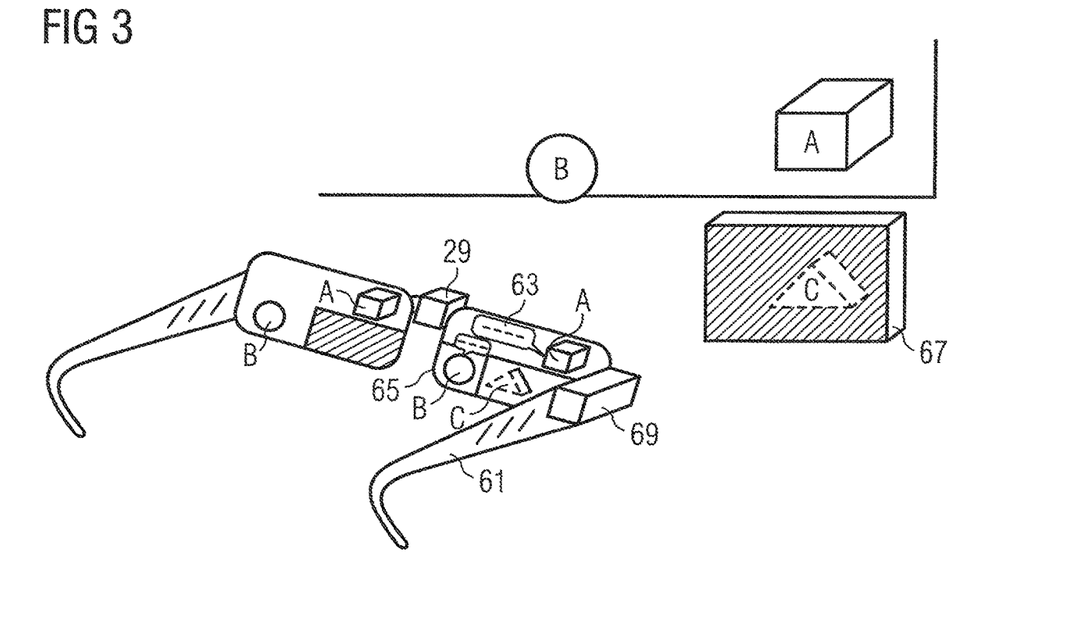
FIG. 3 shows a schematic diagram to illustrate the incorporation of the localization system into the augmentation of visual perception using AR glasses.

FIG. 3 illustrates the possibility of using the method disclosed herein to also display objects with which the wearer of 3D smart glasses has no visual contact. As such, location information for dynamic objects can be added to virtually if an RTLS is included that works in the whole localization area. The RTLS therefore provides location information even if there is no visual contact with the wearer of the 3D smart glasses. The correct coupling of the relative coordinate system to the absolute coordinate system means that the wearer of the 3D smart glasses is able to be presented with information that is not visible, but that is relevant, at the correct location.

In the situation shown in FIG. 3, the wearer (not shown) of smart glasses 61 has a clear view of a machine tool A (shown schematically) and an object B (shown schematically). As already mentioned, the 3D smart glasses 61 can insert information 63 relating to the present operating state for the machine tool A and product information 65 for the object B for the wearer, e.g. just on one side of the 3D smart glasses 61. The information 63 and the product information 65 are examples of display elements of the 3D smart glasses 61.

FIG. 3 also indicates an object C behind a wall section 67 using dashed lines. The object C is concealed from the wearer of the 3D smart glasses 61. If the position of the object C is monitored using the RTLS, the RTLS knows the absolute position of the object C and can pass it on to the 3D smart glasses together with schematically shown image data C' of the object C. The 3D camera can insert the image data C' of the object C into the field of vision of the wearer of the smart glasses 61, this requiring correct coupling of the coordinate systems. The image data C' are another example of a display element of the 3D smart glasses 61.

If the object C moves and e.g. if its absolute position is tracked using a tag of the RTLS, the moving object C or a trajectory to be expected for the movement can also be displayed to the wearer of the 3D smart glasses 61. In this way, the wearer can for example tell whether there is the threat of danger and how he can take preventive action to avoid a collision.

Similar approaches can be used with autonomous transport apparatuses in order to add to the perception of the surroundings vis-à-vis elements that are not visible.

Such visualization of concealed objects can be similarly useful when looking for objects. As such, an AV system can display a good that is being sought to an order picker even if said good is still hidden by other objects.

Further, FIG. 3 shows that a mobile apparatus can have multiple cameras. As such, the 3D smart glasses 61 comprise not only the camera 29 designed as a light sensor but also a camera 69 for detecting the surroundings. The camera 69 generates image data that can be evaluated using an SLAM algorithm, for example.

The coupling of the RTLS and the automatic position finding system moreover permits the use of the mobile apparatus and generally of tags (i.e. the mobile components that can be localized by the RTLS) as an input device or trigger for AR applications. This provides new interaction opportunities. Tags can be used as path markings, for prohibition signs, instructions or else simply just as a haptic anchor for virtual objects. In a camera-based AR system, control is effected by way of gestures, for example. Virtual objects can be placed using an AR input device.

If e.g. virtual objects are coupled to real tags of the localization system, the location of the virtual objects can be influenced by moving the real tags in the relative coordinate system. During production, it is e.g. possible to connect typical instructions to a tag and to store easily visible virtual objects in the AR space therefor.

Figure 4:
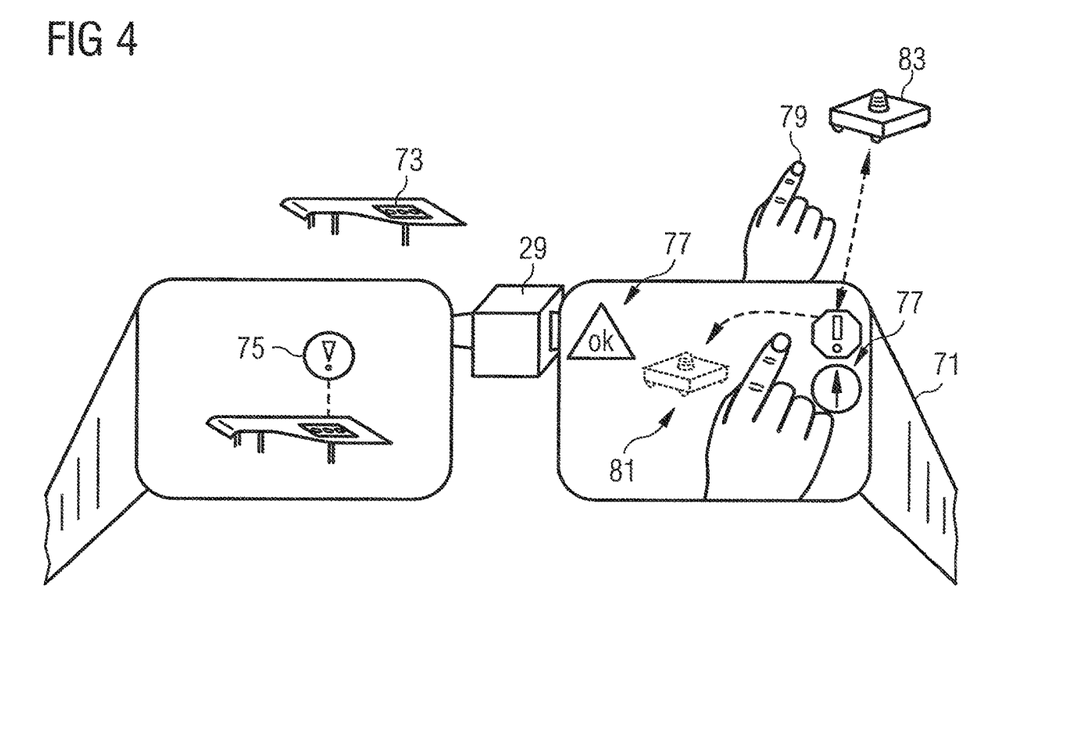
FIG. 4 shows a schematic diagram to illustrate the actuation of a mobile transport apparatus using AR glasses.

FIG. 4 shows an example from industrial manufacturing in which, in the case of an urgent order, a tag having the attribute "urgent" is assigned to a material 73 to be processed. By way of example, this attribute triggers a virtual marker in the AR space, as a result of which wearers of 3D smart glasses in a factory shed see a neon yellow balloon 75 floating above the material 73 beneath the shed ceiling (left-hand side of the 3D smart glasses in FIG. 4). The balloon 75 is another example of a display element of the 3D smart glasses 61.

Additionally, the AR smart glasses 71 can be used in an AR system as an input instrument for RTLS data for controlling specific actions. The AR system can simulate various input areas 77 for the wearer of the 3D smart glasses 71, which input areas can be activated by the wearer using gestures or with a finger 79 (right-hand side of the 3D smart glasses in FIG. 4).

As such, the wearer can e.g. input a target position 81 for a driverless transport vehicle 83 in an AR application. The target position 81 is stored in the coupled RTLS as a target value. The RTLS can now steer the driverless transport vehicle 83 to the target position 81 using the absolute position finding of the RTLS, while the wearer of the 3D smart glasses 71 can perform other tasks.

Alternatively, it is also possible for two or more relative coordinate systems to be brought into line with one another using the absolute coordinate system. As such, for example the target position 81 that is input using an AR system (e.g. the 3D smart glasses 71) in a first absolute coordinate system can be transferred to the driverless transport vehicle 83, which implements its own relative coordinate system. Since the RTLS is used to bring the relative coordinate systems of the AR system and the transport vehicle 81 into line with the absolute coordinate system of the RTLS, direct transfer of coordinates from one AR system (smart glasses) to the other AR system (driverless transport vehicle) becomes possible.

The concepts proposed herein prevent an RTLS and an automatic position finding system from being able to be combined only by way of specific integration projects. The latter are expensive and can lead to artefacts in the representation of the data space.

In such a system, the AR unit can also be used as an identifier for the user and can e.g. unlock access to rooms/areas and can open doors.

The localization calculations of the localization system and the calculations for coupling the coordinate systems, in particular the underlying hardware components, can, to a certain degree, be distributed over stationary and mobile components, the data processing system, the AR system with the AR computing unit and the autonomous transport system with the control computing unit, so that calculations can be performed locally and in a decentralized manner. As such, the stationary and mobile components of the localization system can convey all measurement data (e.g. times of arrival of signals) to the data processing system. The data processing system can comprise a central server unit that has the appropriate processing power to perform calculations in real time for many tags. Further, the data processing system can comprise a data memory in order to store data such as the absolute position data.

Those features, used in the present description, of the methods and systems that have been denoted by "unit", "data processing system", "component", "apparatus" or the like can e.g. be implemented as discrete physical units, as conceptual functional units, e.g. as software code (for the purposes of an operating program) stored in a storage unit (memory), routines of a microprocessor and/or within a hybrid hardware/firmware structure within the scope of knowledge of a person skilled in the art. In addition, two or more "units" etc. can be integrated together in a single physical circuit structure (e.g. an integrated unit or structure). By way of example, a CPU can be controlled by programming code (stored instructions), the programming code being capable of performing the respective functions when it is executed by a processor, such as for example a microprocessor.

The features that are in particular cited in the claims can therefore be in the form of software, hardware and/or a combination of hardware and software. Specific details of the individual units are described in the description (and in particular in the exemplary sections). This provides a person skilled in the art with enough information to implement the applicable structures in hardware circuits or software code. As an example, the "localization unit" disclosed herein can be embodied in the structure of a central processing unit (CPU) configured with instructions for performing the operations for deriving position information from the provided times. The CPU can be part of a local unit/device or of a central server configuration. It can comprise one or more microprocessors in conjunction with one or more storage elements. A storage element can store one or more microprocessor-readable instructions (programs) that, when executed by the microprocessor, perform the triangulation calculations, for example. In addition, apparatuses of the automatic position finding system, of the AR system, of the autonomous transport system and of the localization system can comprise various units that interact with one another in order to perform the desired actions, such as receiving and/or transmitting flash or UWB signals, identifying time features of the flash or UWB frames, etc.

It is explicitly stressed that all of the features disclosed in the description and/or the claims are intended to be regarded as being separate and independent of one another for the purpose of the original disclosure, and are intended to be regarded as being independent of the feature combinations in the embodiments and/or the claims for the purpose of restriction of the claimed invention, in the same way. It is explicitly stated that all of the area details or details of groups of units disclose every possible intermediate value or subgroup of units for the purpose of the original disclosure and for the purpose of restriction of the claimed invention, in particular also as limit for an area detail.

The invention claimed is:

1. A method for coupling a relative coordinate system of a relative automatic position finding system, which is based on scanning of surroundings, to an absolute coordinate system of an absolute localization system, which is based on signal interchange with at least temporarily stationary components of the absolute localization system, the method comprising:
   capturing optically identifiable identifiers of the localization system using a light sensor attached to a mobile apparatus of the relative automatic position finding system,
   ascertaining a relative position for each of the captured optically identifiable identifiers in the relative coordinate system of the relative automatic position finding system,
   retrieving absolute positions of the optically identifiable identifiers in the absolute coordinate system, the optically identifiable identifiers being attached to the at least temporarily stationary components of the absolute localization system,
   determining an absolute position of the light sensor in the absolute coordinate system by comparing the relative positions of the optically identifiable identifiers in the relative coordinate system with the absolute positions of the optically identifiable identifiers in the absolute coordinate system, wherein the comparing comprises size scaling of the relative coordinate system in one or more axes and alignment of the relative coordinate system with respect to the absolute coordinate system, and
   coupling, based on the absolute position of the light sensor, the relative coordinate system to the absolute coordinate system by recording a relationship between the relative coordinate system and the absolute coordinate system based on the size scaling and the alignment,
   determining a relative position of the mobile apparatus in the relative coordinate system, by the relative automatic position finding system, as part of a computer-aided system, and
   compensating a drift of the determination of the relative position of the mobile apparatus using the coupling of the relative coordinate system to the absolute coordinate system.

2. The method as claimed in claim 1, wherein the relative automatic position finding system determines relative changes of position by performing a simultaneous localization and mapping algorithm (SLAM), which involves detecting objects in the surroundings in the relative coordinate system and assigning the detected objects positions in the relative coordinate system, wherein the SLAM algorithm is based on image processing of image data captured using the light sensor.

3. The method as claimed in claim 1, wherein the optically identifiable identifiers comprise light sources that transmit unique light signals associated with respective optically identifiable identifiers, and wherein the light sensor captures the light signals,
   wherein the light sources comprise flashing lights that emit symbols represented in flash sequences, the information content of which symbols permits a unique inference of the light source and hence of the position of the light source in the absolute coordinate system.

4. The method as claimed in claim 1, wherein the optically identifiable identifiers comprise one-dimensional or two-dimensional code structures, and wherein the code structures represent symbols that comprise unique data associated with respective optically identifiable identifiers, and wherein the light sensor captures the code structures.

5. The method as claimed in claim 1, wherein the optical identifiers comprise retroreflectors that reflect incident light in such a way that the light sensor captures reflected light.

6. The method as claimed in claim 1, wherein the light sensor is in the form of:
   a camera, and the relative position of the optically identifiable identifiers is ascertained by distance determination via two-dimensional or three-dimensional object detection in the image data of the camera, or a light detection and ranging (LIDAR) sensor, and the relative position of the optically identifiable identifiers is ascertained by distance determination via a propagation delay measurement.

7. The method as claimed in claim 1, wherein the computer-aided system further comprises a light signal source on the mobile apparatus for generating light signals that can be captured using the light sensor of the relative automatic position finding system, as a result of which the optically identifiable identifiers are captured and the relative positions are ascertained by using a camera with a projection system or a camera with laser-based time-of-flight measurement for relative position finding, and wherein light signals in the infrared, visible and/or ultraviolet spectral range are sent by the mobile apparatus.

8. The method as claimed in claim 1, wherein the absolute positions of the optically identifiable identifiers are transmitted to the computer-aided system via a wireless communication channel by communication with the absolute localization system.

9. The method as claimed in claim 1, wherein the absolute localization system is incorporated in a data network that covers the localization area of the absolute localization system for the purposes of data interchange, the method further comprising:

moving the mobile apparatus into the localization area; and transmitting the absolute positions of the optically identifiable identifiers present in the localization area to the mobile apparatus.

10. The method as claimed in claim 1, wherein the relative coordinate system is coupled to the absolute coordinate system by using the known absolute positions of the at least temporarily stationary components.

11. The method as claimed in claim 1, wherein the optically identifiable identifiers are in the form of light signal units and the light sensor is in the form of a camera, the method further comprising:

initiating sending of light signals by the light signal units in a signal sequence predetermined for each of the light signal units;

capturing the light signals using the camera, wherein the light signals form an arrangement of signal points associated with the respective light signal units in a camera image; and determining the position of the camera in the absolute coordinate system by comparing the arrangement of signal points against the absolute positions of the light signal units in the absolute coordinate system that are associated with the signal points of the arrangement, wherein the relative coordinate system is coupled to the absolute coordinate system in view of the position of the camera in the absolute coordinate system by adjusting an attitude of the relative coordinate system with reference to the camera.

12. The method as claimed in claim 11, wherein the light signals are sent in the infrared, visible and/or ultraviolet spectral range and the camera is designed to detect infrared, visible and/or ultraviolet light.

13. The method as claimed in claim 11, wherein the comparison of the arrangement of signal points involves the detected light signals being made to coincide with the known local reference of the related light signal units by coordinate transformation.

* * * * *